United States Patent
Wolf

(10) Patent No.: US 6,495,076 B2
(45) Date of Patent: *Dec. 17, 2002

(54) CONTROL METHOD FOR A HYDRAULIC MECHANISM OF A TECHNICAL PROCESS

(75) Inventor: Thomas Wolf, Heideck (DE)

(73) Assignee: Siemens AG, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,620

(22) PCT Filed: Feb. 4, 1998

(86) PCT No.: PCT/DE98/00908
§ 371 (c)(1),
(2), (4) Date: Aug. 17, 1999

(87) PCT Pub. No.: WO98/36334
PCT Pub. Date: Aug. 20, 1998

(65) Prior Publication Data
US 2002/0084541 A1 Jul. 4, 2002

(30) Foreign Application Priority Data
Feb. 17, 1997 (DE) .......................... 197 06 105

(51) Int. Cl.[7] .......................... G05B 19/19; B29C 45/82
(52) U.S. Cl. .................. 264/40.5; 264/328.1; 425/135; 700/200
(58) Field of Search .............................. 264/40.1, 40.5, 264/40.7, 328.1; 425/145, 135; 700/200, 282

(56) References Cited

U.S. PATENT DOCUMENTS

| | | | | |
|---|---|---|---|---|
| 4,610,831 A | * | 9/1986 | Mihara | ...................... 264/40.7 |
| 4,714,005 A | * | 12/1987 | Leemhuis | |
| 5,666,806 A | * | 9/1997 | Dietz | |
| 5,762,973 A | * | 6/1998 | Holzschuh | ................. 264/40.7 |

FOREIGN PATENT DOCUMENTS

DE 43 15 626 7/1994

OTHER PUBLICATIONS

Köckemann et al., Regelung elektrohydraulischer Antriebe unter Berücksichtigung industrieller Randbedingungen, Automatisierungstechnik, 1991, Nr. 6, S. 187–198* Described in the Specification.

Pritschow et al., Hochdynamische digitale Regelung von Kunststoffspritzgiessmaschinen, O+P Ölhydraulik und Pneumatik, 1993, Nr. 6, S. 528–531* Described in the Specification.

Keller, Adaptive, Regelung eines pneumatischen Linearantriebs, Ölhydraulik und Pneumatik Bd. 38, Nr. 4, Apr. 1, 1994** Listed in the Search Report.

* cited by examiner

Primary Examiner—Jill L. Heitbrink

(57) ABSTRACT

A control method for generating a manipulated variable for controlling a hydraulic drive. In this case, account is taken of at least a desired value for the speed of the hydraulic drive, a first parameter, which simulates the response characteristic of the hydraulic drive, and a second parameter, which simulates the internal resistance which the technical process, opposes to the hydraulic drive. It is advantageous that nonlinear dependencies of the hydraulic drive can be taken into account for generating the manipulated variable driving the hydraulic drive. A technically complicated sensor system may be dispensed with. The control method may serve, in particular, the nonlinear control of a plastics injection molding machine.

11 Claims, 3 Drawing Sheets

CONTROL METHOD FOR A HYDRAULIC MECHANISM OF A TECHNICAL PROCESS

BACKGROUND INFORMATION

In hydraulic drives which serve to operate a technical process, the hydraulic drive may have have a specific velocity profile. The hydraulic drive acts on the technical process in a stipulated desired drive speed.

On the one hand, it is possible, in particular, to control the hydraulic drive with reference to its operating speed by means of a closed-loop control circuit. The disadvantage of such closed-loop control circuits consists in that the control requires a precise, quick and therefore technically complicated sensor technology and control engineering. The sensor technology serves to detect specific measured values, required as input variables of the closed-loop control circuit, of the hydraulic drive, such as, for example, specific pressures, valve strokes and drive speeds.

Three different closed-loop concepts, specifically state control, adaptive control and structurally variable model follower control are described in Köckemann, A, Konertz, J, Lausch, H. "Regelung elektrohydraulischer Antriebe unter Berücksichtigung industrieller Rand-bedingungen" "Closed-loop control of electrohydraulic drives taking account of industrial boundary conditions"; at —Automatisierungstechnik, 1991, No. 6, pages 187 to 196. Furthermore, a digital closed-loop control of plastics injection molding machines is described in Pritschow, G Dalacker, M, Treffler, V.: "Hochdynamische digitale Regelung von Kunststoffspritzgießmaschinen", "Highly dynamic digital closed-loop control of plastics injection molding machines"; O+P "Ölhydraulik und Pneumatik", 1993, No. 6, pages 528 to 531 . In these closed-loop control circuits, the closed-loop control likewise requires a corresponding sensor technology and control engineering.

German Patent No. DE 43 15 626 describes an open-loop control for a hydraulic drive, in which a desired value for moving the drive is calculated from a prescribed desired value. In this case, the calculation is based in each case at least on a measured state variable of the drive at the instant of the calculation.

SUMMARY

It is an object of the present invention to provide a control method for a hydraulic drive which permits nonlinearities to be taken into account.

The object is achieved with the aid of the control method according to the present invention, and with the aid of the plastics injection molding machine according to the present invention, having an open-loop control circuit for carrying out the control method, and with the aid of the use of the control method for controlling a plastics injection molding machine.

The control method according to the present invention has the advantage that it is possible to take account of nonlinear dependencies of the hydraulic drive acting on the technical process in order to generate the manipulated variable driving the hydraulic drive. In this case, it is advantageously possible to dispense with a technically complicated sensor technology for measured-value acquisition.

It is particularly advantageous that in the control method according to the present invention account is taken both of properties of the hydraulic drive and of properties of the technical process, particularly internal resistance for which the technical process opposes to the hydraulic drive.

In an advantageous embodiment of the control method according to the present invention, the parameter simulating the internal resistance is cyclically updated. It is thereby advantageously possible for the control method to be switched over adaptively, in particular automatically, to changing, technical processes which are operated by the hydraulic drive.

It is therefore advantageously possible by using the control method according to the present invention in plastics injection molding machines, for example, to eliminate a troublesome heating and cooling phase before using a new plastics injection molding machine, since the cyclically performed updating can automatically take account of the changes in the technical process.

A further advantage is that the control method according to the present invention can be carried out by using a precontrol circuit in a closed-loop control circuit. An appropriate precontrol circuit can be used, for example, as support for a closed-loop control circuit. Whereas the control method according to the present invention takes over the coarse presetting of the hydraulic drive, the closed-loop control circuit serves the purpose of further, additional fine tuning. It is thereby possible for the accuracy and speed of the hydraulic drive to be improved.

DETAILED DESCRIPTION

Figure 1:
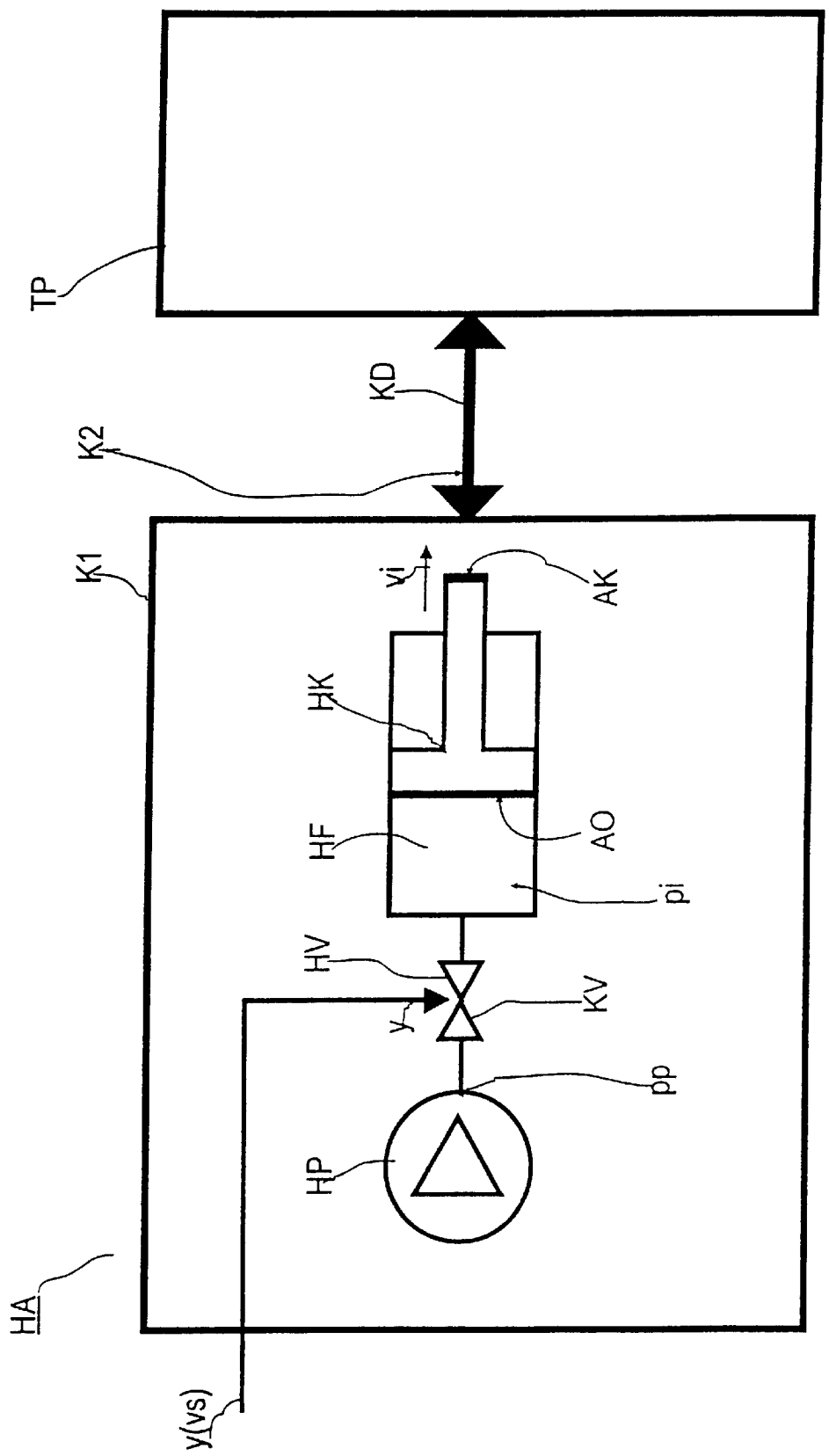
FIG. 1 shows, by way of example, a diagrammatic design of a hydraulic drive of a technical process, a manipulated variable for driving the hydraulic drive being generated by the control method according to the present invention.

A schematic design of a hydraulic drive HA of a technical process TP is represented by way of example in FIG. 1. The control method according to the present invention generates a manipulated variable y for driving the hydraulic drive HA. According to the present invention when the manipulated variable y is being generated account is taken at least of a desired value vs for the drive speed of the hydraulic drive HA, a first parameter K1, which stimulates the response characteristic of the hydraulic drive HA, and a second parameter K2, which simulates the internal resistance of the technical process TP.

For example, the manipulated variable y serves to drive a hydraulic valve HV in the hydraulic drive HA. The valve controls the inflow of a hydraulic liquid HF from a hydraulic pump HP into at least one hydraulic piston HK in the hydraulic drive HA. The manipulated variable y for opening and closing the hydraulic valve HV is, in particular, referred to as "valve stroke". The control of the hydraulic valve HV is carried out in this case in accordance with the present invention in such a way that, in particular, a prescribed desired value vs of the drive speed of the hydraulic piston HK is effected.

Furthermore, in generating the manipulated variable y driving the hydraulic drive HA, the control method according to the present invention takes account of a first constant pp, which simulates the pressure which is produced by a hydraulic pump HV in the hydraulic drive HA. As a rule, this is the pressure, upstream of the hydraulic valve HV, of the hydraulic liquid HF.

As will be explained in further detail below below, in accordance with the invention the manipulated variable y is yielded as:

$$y = \frac{K1 \ vs}{\sqrt{pp - K2 \cdot vs}} \tag{1}$$

The first parameter K1, simulating the response characteristic of the hydraulic drive HA, is, in particular, a "machine-dependent" variable, that is to say its value depends in each case on the appropriate hydraulic drive HA which is used to carry out the method. In one embodiment of the present invention, the first parameter K1 has, in particular, a second constant AO, which simulates that cross-sectional surface of the hydraulic pistons HK of the hydraulic drive HA to which the hydraulic liquid HF is applied. Furthermore, the first parameter K1 can advantageously have a third constant KV, which simulates the response characteristic of a hydraulic valve HV in the hydraulic drive HA. This is, for example, the "valve constant" of the hydraulic valve HV. The first parameter K1 is preferably approximately proportional to the quotient of the second constant AO and the third constant KV.

$$K1 = \frac{AO}{KV} \tag{2}$$

When the control method according to the present invention is used, for example, to control hydraulic drives HA of plastics injection molding machines, the fourth constant KD simulates, in particular, the injection resistance which a plastics injection mold exhibits with respect to plastic being pressed in. In particular, a change of mold of the use of a different type of plastic composition can cause a change in the injection resistance and thus in the fourth constant KD.

The second parameter K2, simulating the internal resistance, is a process-dependent variable which depends on properties of the technical process TP. In one embodiment of the invention, the second parameter K2, in particular, is formed from the product of a fourth constant KD and a proportionality factor P. The fourth constant KD in this case simulates the internal resistance, which opposes the hydraulic drive HA of the technical process TP.

$$K2 = P \cdot KD \tag{3}$$

In particular, the proportionality factor P has a second constant AO, which simulates that cross-sectional surface of the hydraulic pistons HK of the hydraulic drive HA to which the hydraulic liquid HF is applied. Moreover, in particular, the proportionality factor P has a fifth constant AK. This simulates that cross-sectional surface of hydraulic pistons HK of the hydraulic drive HA which acts on the part of the hydraulic drive HA leading to the technical process TP. The proportionality factor P is preferably approximately proportional in this case to the quotient of the square of the fifth constant AK and the second constant AO.

$$K2 = \frac{AK^2}{AO} \cdot KD \tag{4}$$

Figure 2:
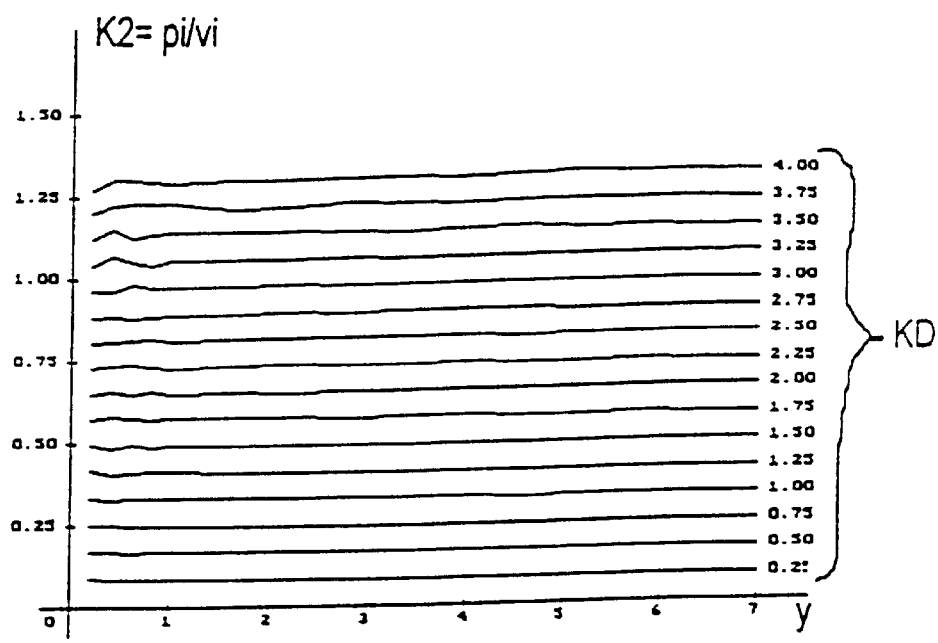
FIG. 2 shows, by way of example, different profiles of the ratio of the actual value of the pressure to the actual value of the drive speed for various internal resistances of the technical process, plotted against a range of values of the manipulated variable generated by the control method according to the present invention.

By way of example, FIG. 2 represents different profiles of the quotient of the actual value, acting on the hydraulic pistons HK of the hydraulic drive HA, of the pressure pi of the hydraulic liquid HF and the actual value of the drive speed vi of the hydraulic piston HK plotted against a range of values of the manipulated variable y. The various profiles result from differing values of the fourth constant KD simulating the internal resistance. In this case, the quotient of the actual value of the pressure pi and the actual value of the drive speed vi remains virtually constant independently of the value of the manipulated variable y for a specific value of the fourth constant KD. As is explained below in further detail, as a further embodiment of the control method according to the present invention the second parameter K2 can be defined as the quotient of the actual value, acting on the hydraulic pistons HK, of the pressure pi of the hydraulic liquid HF and the actual value of the drive speed vi of the hydraulic piston HK in a steady state of the hydraulic drive HA.

$$K2 = \frac{pi}{vi} \tag{5}$$

Since the second parameter K2 therefore remains approximately constant independently of the value of the manipulated variable y, it need be fixed only once for a specific technical process TP. This can advantageously be performed, for example, by measured-value acquisition of the actual value of the pressure pi and the associated actual value of the drive speed vi.

In order to derive the equations on which the control method according to the present invention is based and which have already been set forth above, it is possible, in particular, with reference to FIG. 1 to describe the properties of the hydraulic valve HV of the hydraulic HA by means of a Bernoulli equation:

$$Q_{ol} = y \cdot KV \cdot \sqrt{pp - p_{ol}} \tag{6}$$

As process parameters, use is made in equation 6 of the pumping pressure of the hydraulic pump HP as first constant pp, the operating pressure $p_o$l of the hydraulic liquid HF in the hydraulic piston HK, the volumetric flow $Q_o$l of the hydraulic liquid HF, the manipulated variable y as valve stroke of the hydraulic valve HV, and the valve constant KV for describing the engineering properties of the hydraulic valve HV. For reasons of simplicity, the pumping pressure pp is set as constant, something which is not actually the case either in a real hydraulic drive or in a simulation model. There is a dependence of the pumping pressure pp on the volumetric flow $Q_o$l, which has, however, been neglected in equation 6.

The following equation, in particular, can be specified for the volumetric flow $Q_o$l, a compressibility of the hydraulic liquid HF having been neglected, that is to say that the entire hydraulic liquid HF conveyed by the hydraulic pump HP contributes to the displacement of the hydraulic piston HK. The following relationship therefore holds for the volume $V_{öl}$ of the hydraulic liquid HF moved in the hydraulic piston HK with the assistance of the second constant AO, the working stroke x covered by the hydraulic piston HK, and the associated drive speed v:

$$V_{öl}=AO \cdot x \qquad (7)$$

$$Q_{öl} = \frac{dV_{öl}}{dt} = AO \cdot \frac{dx}{dt} = AO \cdot v \qquad (8)$$

The following is obtained, in particular, by substituting equation 8 in equation 6 and rearranging for the valve stroke y:

$$y = \frac{AO \cdot v}{KV \cdot \sqrt{pp - p_{öl}}} \qquad (9)$$

In this equation, the valve stroke y depends on the two process variables v and pp. Since there is a direct proportionality between the operating pressure $p_{ö}l$ of the hydraulic liquid HF and the drive speed v of the hydraulic piston HK, it is possible, in particular, for one of the two variables to be replaced respectively by the other. It is possible to use as proportionality factor the fourth constant KD, which simulates the internal resistance of the technical process TP opposing the hydraulic drive HA.

In the steady state of the hydraulic drive HA, the drive speed v of the hydraulic piston HK is constant. This means that the acceleration of the hydraulic piston HK, or the force acting thereon which results from the force $F_ö l$ transmitted from the hydraulic liquid HF to the hydraulic piston HK and the force Fk transmitted from the hydraulic piston HK to the hydraulic liquid HF vanishes. The result of this is that:

$$0=F_{öl}-F_K \qquad (10)$$

$$0=p_{öl} \cdot AO-V \cdot KD \cdot AK^2 \qquad (11)$$

$$v = \frac{p_{öl} \cdot AO}{KD \cdot AK^2} \qquad (12)$$

The following equation for the second parameter K2 results in the case of a constant actual value of the drive speed vi=v and the associated actual value of the pressure Pi=$P_ö$l:

$$K2 = \frac{AK^2 \cdot KD}{AO} = \frac{p_{öl}}{v} = \frac{p_i}{v_i} \qquad (13)$$

Figure 3:
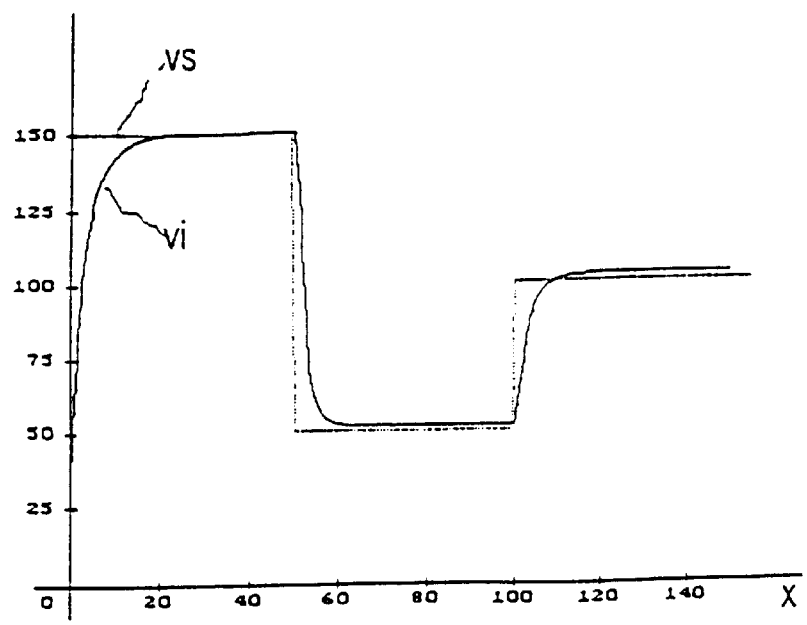
FIG. 3 shows, by way of example, a prescribed profile of the desired values for the drive speed of the hydraulic drive plotted against the driving stroke, and the actual values may be achieved by using the control method according to the present invention.

The profile of the desired values for the drive speed vs of the hydraulic drive HA is represented by way of example in FIG. 3. Here, the working stroke x of the hydraulic drive HA is represented on the abscissa. The working stroke x relates here to the path covered, in particular, by the hydraulic piston HK during operation of the technical process. Also represented is the profile of the actual values of the drive speed vi, actually achieved by means of the control method according to the invention, for a constant first parameter K1 and constant second parameter K2. The profile of the actual values vi advantageously quickly approaches the profile of the desired values vs, even after sudden changes.

In a further embodiment of the control method according to the present invention, said method also serves advantageously for use in a precontrol of a hydraulic drive HA. For example, in order to carry out the control method according to the present invention an appropriate open-loop control circuit can be connected in parallel with a closed-loop control circuit as an additional supportive circuit thereof.

In a further advantageous embodiment of the control method according to the present invention, the second parameter K2 is cyclically updated with reference to changes in the technical process TP. In this case, the manipulated variable y is preferably generated by means of the control method according to the present invention as a function of the desired value vs for the drive speed of the hydraulic drive HA. Such changes, which require updating of the second parameter K2, are, in particular, changes in the internal resistance opposing the hydraulic drive HA of the technical process TP. For example, in the case of a plastics injection molding machine the manipulated variable y represents, in particular, the "valve stroke", and the internal resistance represents, in particular, "injection resistance". A change in the injection resistance can, for example, result from a change of mold of use of a different plastic.

Thus, an adaptive precontrol of a hydraulic drive HA can advantageously be effected using the control method according to the present invention. The calculation of the second parameter using equation 5 is cyclically updated in accordance with the present invention, preferably during the operation of the hydraulic drive HA.

$$K2(t) = K2(t-1) + h \cdot \left( \frac{pi}{vi} - K2(t-1) \right) \qquad (14)$$

Here, K2(t) forms the updated second parameter K2, while K2(t−1) forms the second parameter K2, which is the basis for the control method according to the present invention before the updating. An adaptation constant h fixes how quickly the updated second parameter K2(t) approaches the currently measured values of the actual value of the pressure pi of the hydraulic liquid HF and of the actual value of the drive speed vi of the hydraulic piston HK. Equation 14 holds, in particular, for a temporal constant actual value of the drive speed vi. An adaptation of the second parameter K2 is thus particularly advantageous when the temporal change in the actual value of the drive speed vi is sufficiently small. The adaptation constant h is preferably inversely proportional with respect to the temporal change in the actual value of the drive speed vi. If there is no temporal change to the actual value of the drive speed vi, that is to say vi=0, there is, in particular, a maximum value hmax of the adaptation constant h, that is to say h=hmax. If, by contrast, the temporal change in the actual value of the drive speed vi exceeds a maximum value aimax=∂vi/∂t, there is, in particular, a minimum value hmin of the adaptation constant h, that is to say for example, h=hmin=0. The control method according to the invention, in particular the adaptive response of the adaptation constant h with respect to the temporal change in the actual value of the drive speed vi, can advantageously be carried out by means of a control circuit using fuzzy logic, for example a single-variable or multi-variable fuzzy system.

Figure 4:
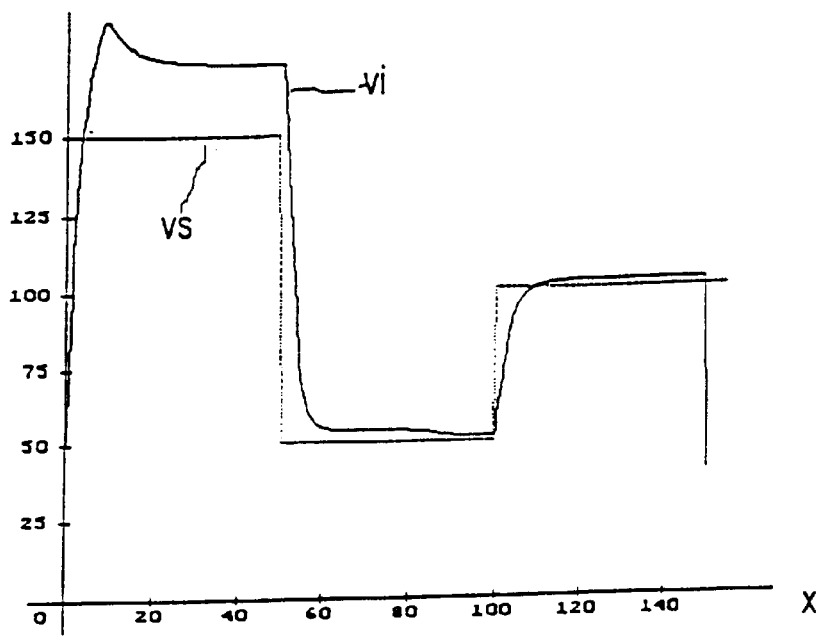
FIG. 4 shows, by way of example, the profiles of actual value and desired value of the drive speed in the case of cyclical updating of the parameter simulating the internal resistance, which is initially preset too small at the start of the driving stroke.
Figure 5:
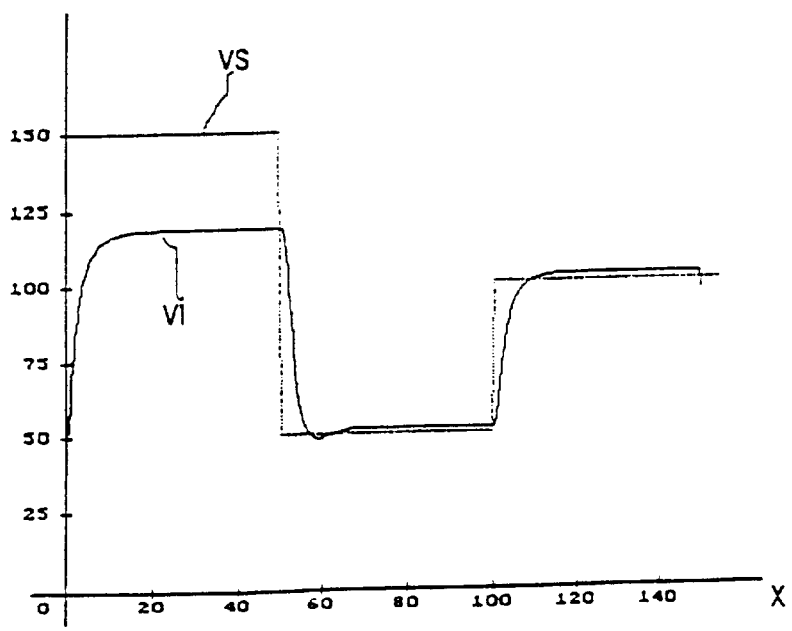
FIG. 5 shows, by way of example, the profiles of actual value and desired value of the drive speed in the case of cyclical updating of the parameter simulating the internal resistance, which is initially preset too large at the start of the driving stroke.

The profiles of actual value vi and desired value vs of the drive speed are represented, by way of example, in FIGS. 4 and 5, the second parameter K2, which simulates the internal resistance, being updated cyclically. Whereas in FIG. 4 the second parameter K2 is preset too small at the start of the driving stroke x of the hydraulic piston HK, in FIG. 5 it is initially preset too large. With continuing adaptation of the second parameter K2 as the driving stroke x increases, the profile of the actual value vi approaches that of the desired value vs.

In a further embodiment of the present invention, the control method according to the present invention serves, in particular, for nonlinear control of a plastics injection molding machine, the plastics injection molding machine having, for example, an open-loop control circuit for carrying out the control method according to the present invention.

What is claimed is:

1. A method for generating a manipulated variable for a hydraulic drive of a technical process, comprising:

determining a desired speed of the hydraulic drive;

simulating a response of the hydraulic drive by a first constant parameter;

simulating an internal resistance of the technical process opposed to the hydraulic drive as the hydraulic drive drives the technical process by a second parameter having a value cyclically updated with reference to change in the technical process;

simulating a pressure produced by a hydraulic pump in the hydraulic drive by a first constant; and determining the manipulated variable as a function of the desired speed of the hydraulic drive, the first parameter, the second parameter, and the first constant.

2. The method according to claim 1, wherein said simulating the response of the hydraulic drive includes simulating, by a second constant, a cross-sectional surface of hydraulic pistons of the hydraulic drive to which a hydraulic liquid is applied.

3. The method according to claim 2, said simulating the response of the hydraulic drive includes:

simulating the response characteristic of a hydraulic valve in the hydraulic drive by a third constant.

4. The method according to claim 3, wherein the first parameter is approximately proportional to a quotient of the second constant and the third constant.

5. The method according to claim 1, further comprising:

forming the second parameter from a product of a fourth constant which simulates the internal resistance of the process, and a proportionality factor.

6. The method according to claim 5, further comprising:

determining the proportionality factor as a function of a second constant, the second constant simulating a cross-sectional surface of hydraulic pistons of the hydraulic drive to which a hydraulic liquid is applied.

7. The method according to claim 6, wherein said determining the proportionality factor includes:

determining the proportionality factor as a function of a fifth constant, the fifth constant simulating a cross-sectional surface for the hydraulic pistons of the hydraulic drive which acts on a part of the hydraulic drive leading to the technical process.

8. The method according to claim 7, wherein said determining the proportionality factor includes:

determining the proportionality factor as a function of a quotient of a square of the fifth constant and the second constant.

9. The method according to claim 1, further comprising:

determining the second parameter as a function of an actual of pressure of hydraulic fluid acting on a hydraulic piston and an actual value of a drive speed of the hydraulic piston, the actual value of the pressure and the actual value of the drive speed being determined for a steady state of the hydraulic drive.

10. A method for driving a plastics injection molding machine, comprising:

determining a desired speed of the hydraulic drive;

simulating a response of the hydraulic drive by a first parameter;

simulating an internal resistance of the technical process opposed to the hydraulic drive as the hydraulic drive drives the technical process by a second parameter having a value cyclically updated with reference to change in the technical process;

simulating a pressure produced by a hydraulic pump in the hydraulic drive by a first constant;

determining the manipulated variable as a function of the desired speed of the hydraulic drive, the first parameter, the second parameter, and the first constant; and driving the plastics injection molding machine as a function of the manipulated variable.

11. A system for driving a plastics injection molding machine, comprising:

a hydraulic drive; and a control circuit that controls the hydraulic drive, the control circuit determining a manipulated variable for controlling the hydraulic drive as a function of a desired speed of the hydraulic drive, a first parameter, a second parameter, and a first constant, the first parameter simulating a response of the hydraulic drive, the second parameter simulating an internal resistance of a technical process opposed to the hydraulic drive as the hydraulic drive drives the technical process by a second parameter having a value cyclically updated with reference to change in the technical process, and the first constant simulating a pressure produced by a hydraulic pump in the hydraulic drive, the control circuit controlling the hydraulic drive as a function of the manipulated variable.

* * * * *